3,480,691
PRIMER COATING COMPOSITIONS CONTAINING CARBOXYLATED BUTADIENE ACRYLONITRILE COPOLYMER, VINYL CHLORIDE COPOLYMER, A POLYACRYLATE, AN EPOXIDE RESIN AND A PHENOL-FORMALDEHYDE RESIN
William C. Jeff, North Plainfield, Thomas Luyster, Jr., Saddle Brook, James F. Lynch, Jr., Newark, and Frank A. Moroli, Clark, N.J., assignors to John L. Armitage & Co., Newark, N.J., a corporation of New Jersey
No Drawing. Filed Sept. 5, 1967, Ser. No. 665,280
Int. Cl. C08f 3/76
U.S. Cl. 260—831
8 Claims

ABSTRACT OF THE DISCLOSURE

Primer compositions especially suitable for use in making special textured organic coating systems are disclosed. The special systems referred to are those in which a form-retaining member such as a metal sheet is first coated with a primer, a discontinuous ink pattern is then applied, and, finally, a resinous top layer is applied, the end result being a textured effect with a pattern determined by the inked design, the high points of the textured coating being over the uninked portions and the low points being over the inked portions.

The primer compositions comprise a mixture of five different resins, as follows:

Resin No. I—a carboxyl-modified, butadieneacrylonitrile copolymer;
Resin No. II—a vinyl chloride-vinylidene chloride copolymer;
Resin No. III—methyl methacrylate polymer or a methyl methacrylate-ethyl acrylate copolymer;
Resin No. IV—an epoxy resin; and
Resin No. V—a compatible, alkaline-catalyzed, oil insoluble, phenol-formaldehyde resin, hereinafter also referred to as heat reactive oil insoluble phenolic resin.

A number of specific formulations of primer compositions is given, as well as instructions for their use to form textured articles of the kind referred to.

CROSS REFERENCE TO RELATED U.S. PATENT APPLICATION

Our co-pending patent application, Ser. No. 460,216, filed June 1, 1965, discloses and claims textured organic systems of the type for which the primers of this invention are especially suited.

BACKGROUND OF THE INVENTION

There have been various types of textured finishes which have been developed.

The classical wrinkle finish is produced by causing the surface of an organic film former to swell and fold into a shriveled pattern of hills and valleys. It is accomplished by the use of drying oils or more recently by vinyl-modified di-methacrylate or epoxy formulations. These finishes are available in a variety of sizes; e.g., "fine" or "typewriter," "medium," or "coarse" patterns. The fine wrinkle viewed under 10X magnification exhibits exactly the same surface characteristics as the coarse type. There is, then, a classical wrinkle pattern, and those schooled in the art are familiar with its nature.

The leather-like texture finish described in U.S. Patent 2,715,587 provided a new type pattern that was readily distinguished from the standard wrinkle finish. It, too, can be processed in fine, medium or coarse pattern sizes. It, however, cannot be substantially changed in character.

U.S. Patent 2,982,670 describes a leather-like finish that is produced by a two-step process. It is very similar in appearance to the articles made in accordance with U.S. Patent 2,715,587 but can be readily identified and distinguished from such articles and wrinkle finishes. It has its own unique pattern either in a fine or heavy pattern. It is also limited by the fact that it may be altered in size appearance only and not by any basic configuration change.

The fourth finish that has been used widely as a texture coating by industry is the "spatter" type. It fits in the general family of "leather-like" textures and is also limited to variations of size development by application techniques. The irregular surface is produced by spraying a smooth, thin coat to a substrate and then following with a second poorly atomized or spatter coat of the same material. A rough bumpy surface results that is typical and readily identified as fitting in the class of spatter textures.

Various other types of paints have been employed to produce surface irregularities. Those schooled in the art are familiar with "crystal," "crackel" and "veiling" lacquers. All of these finishes share a common disadvantage of being limited to a range of pattern sizes. Furthermore, most suffer from poor control or reproduction of exact pattern size. The stresses that were set up during the shrinkage of the crackel coat were not always relieved along the same lines and thus the results were uncontrollable and unpredictable.

In our aforesaid co-pending application, Ser. No. 460,216, we disclose a two-and three-step system for providing a texture of pre-determined, reproducible design. In the preferred three-step method we coat a form-retaining member with a primer, then with a discontinuous, ink layer so as to form a pattern, and then with a top layer, as above described.

SUMMARY OF THE INVENTION

We have now found that the unique combination of five resins set forth in the Abstract of Disclosure serves as a basis for primer compositions which are especially suitable to make the special textured articles disclosed in application Ser. No. 460,216.

DESCRIPTION OF THE INVENTION

Novel primers especially suitable for use in making the aforementioned textured articles are made by employing a unique combination of five resin components:

(a) a carboxyl-modified, butadiene-acrylonitrile copolymer;
(b) a vinyl chloride-vinylidene chloride copolymer;
(c) a member selected from the group consisting of polymethyl methacrylate and a copolymer of methyl methacrylate and ethyl acrylate;

(d) an epoxy resin; and (e) a compatible, alkaline-catalyzed, oil insoluble phenol-formaldehyde resin.

As will be understood by those skilled in the coatings art, other ingredients, such as, stabilizers, pigments and solvents, may be used to complete the compositions.

Each resin performs certain functions in the primer formulations. Many of the properties that are developed by the use of the novel blend are unexpected and would not be contemplated by those skilled in the art.

The acrylonitrile-butadiene copolymer appears to stabilize the combination of resins against discoloration. This is difficult to explain in light of the fact that it is carboxyl-modified and ordinarily acid conditions accelerate the breakdown of polymers like vinylidene chloride. This resin also lends flexibility and impact resistance to the system.

The vinylidene chloride-vinyl chloride copolymer appears to improve compatibility of the resin blend and improves pigment suspension. Removal of this resin reduces the texturing tendency of the system to nil.

The acrylic resin promotes the necessary adhesive bond between the topcoat and primer. Delamination will be evident if this resin is not present.

The epoxy resin is essential, in conjunction with the phenolic resin, in developing an adequate adhesive bond between the complete system and the metal substrate.

The phenolic resin is used as a curing agent for the epoxy resin and is therefore essential for coating to substrate adhesion.

The primers of this invention are prepared in conventional manner. For example, all of the ingredients can be charged into a pebble mill and ground to a Hegman North Standard fineness of 6.0.

In use, our primers are first thinned to a suitable spraying viscosity, e.g., to a viscosity of 25 seconds as measured on a No. 4 Ford cup. Conventional solvents, such as methyl isobutyl ketone, may be used as thinners. A film, to yield from about 0.25 to 1.0 mil dry film thickness, is sprayed onto a suitable substrate, using standard commercially-available spray equipment. The sprayed structure is then baked to dry, e.g., at 300° F. for 5 to 10 minutes. Suitable substrates are form-retaining members, such as metal, plastic, and sealed (non-porous wood), wood products or paper surfaces, and may be rigid or flexible.

A suitable ink is then applied, e.g., by offset gravure. The gravure can be a 100 line screen with an 80-90 micron deep etch. The design may be any suitable one, for example, a pigskin-like single line design. Conventional inks may be used without reducing the viscosity, as viscosities within the range from about 2000 cps. to 20,000 cps. give satisfactory results. The inked structure may be air dried, or the topcoat may be applied to it immediately, without any drying of the inked structure.

The topcoating composition is applied in a conventional manner, e.g., by spraying with standard, commercial spray equipment after thinning to a suitable viscosity, such as 30-35 seconds (No. 2 Zahn Cup), with a suitable solvent such as toluene. A film sufficient to give a dry film thickness of about 3 to 5 mils is applied. The structure is then dried, e.g., for 2 minutes under air dry, followed by 5 minutes at 200° F. and 15 minutes at 350°-365° F.

An example of the carboxyl-modified butadiene-acrylonitrile copolymers which can be used to make primers of this invention is the resin marketed by B. F. Goodrich Chemical Co., under the designation, Hycar 1472. The molecular weight of this product is within the range from about 70,000 to about 100,000. The percent acrylonitrile by weight is about 34-36% and that of butadiene is about 66-64%.

The uncarboxylated resin is inoperable, as it is incompatible with the other components of the primers of this invention.

An operable vinyl chloride-vinylidene chloride copolymer is that also marketed by B. F. Goodrich Chemical Co., as Geon 222. This product has a specific viscosity of 0.17, as measured in a solution of 0.2 gram of resin in 100 ml. of nitrobenzene, at 20° C.

Polyvinylidene chloride and copolymers of vinyl chloride and vinyl acetate are incompatible with the other components of the primers of this invention and cannot be used.

Among the acrylic resins which can be used are polymethyl methacrylate, e.g. Rohm and Haas' Acryloid A-101 and a copolymer of methyl methacrylate and ethyl acrylate as marketed by Rohm and Haas under the designation, Acryloid B-44. This is a 40% resin solution in toluol, having a specific viscosity of 600-1100 cps. at 30° C.

It is surprising that co-polymers of methyl methacrylate and butyl methacrylate, of ethyl methacrylate and methylacrylate, and of butyl methacrylate and methylacrylate, cannot be used in our primers, on account of incompatibility with other ingredients. The same is true of polymethyl acrylate.

As epoxy resins, we mention those marketed by Ciba Chemical Co., under the designation of Araldite. These are bisphenol A-epichlorhydrin resins. Specific data for various of these resins follows:

|  | Epoxy Equiv. | Av. Mol. Wt. | Sp./G. | Durran's Melt Pt° |
|---|---|---|---|---|
| Araldite 6084 | 875-3025 | 1,400 | 1.19 | 95-105 |
| Araldite 7071 | 450-530 | 900-1,000 | 1.19 | 65-75 |
| Araldite 7097 | 1,650-2,000 | 2,900 | 1.17 | 113-123 |
| Araldite 6099 | 2,500-4,000 | 3,800 | 1.18 | 145-155 |

A heat reactive, oil insoluble, phenolic resin which gives excellent results is that marketed by Union Carbide under the designation, BKR-2620. This has a specific gravity of 1.23-1.25, a softening point of 180°-210° F. and a viscosity of 9-12, on the Gardner-Holdt Scale of 9 to 12, as measured on a 50% solution of the resin in ethanol.

We have found that the proportions of the resin components may be varied within limits to furnish primers having the property of being especially suitable for use in making the aforementioned textured systems. We give below operable and presently-preferred ranges, the differences between the total weight and 100 representing conventional ingredients such as solvents and pigments. All parts and percents in these specifications and claims are by weight, unless otherwise specified. All temperatures are in degrees Fahrenheit, unless otherwise specified.

|  | Permissive Range | Preferred Range |
|---|---|---|
| Resin No. I | 0.5 to 5.0 | 1.0 to 3.0 |
| Resin No. II | 10.0 to 30.0 | 10.0 to 20.0 |
| Resin No. III | 5.0 to 20.0 | 5.0 to 15.0 |
| Resin No. IV | 0.5 to 5.0 | 1.0 to 3.0 |
| Resin No. V | 0.1 to 1.0 | 0.2 to 0.5 |

As already noted, in addition to the resins, our novel primers contain conventional ingredients, such as stabilizers, pigments and solvents. Illustrative examples of these conventional ingredients include:

(a) Pigments.—Titanium dioxide and other commonly-used colored pigments such as lead chromates, carbon blacks, iron oxides, cadmium reds, etc.

(b) Stabilizers.—Metallic soaps such as those derived from barium, zinc, tin, cadmium, etc.

(c) Solvents.—Methyl ethyl ketone, toluol and ethanol, per se or in admixture, e.g., in the ratio of 70 to 25 to 5 parts by weight, respectively, Primer formulations having the following compositions were prepared:

|  | Ex. 1 | Ex. 2 | Ex. 3 | Ex. 4 | Ex. 5 | Ex. 6 |
|---|---|---|---|---|---|---|
| Viscosity (No. 4 Ford viscometer at 78° F.), sec. | 65 | 70 | 60 | 75 | 50 | 60 |
| Wt./gal. | 8.0 | 9.05 | 8.32 | 8.9 | 8.4 | 8.4 |
| Solids Content (percent by weight) | 27.4 | 35.0 | 36.7 | 36.8 | 31.5 | 32.3 |

| Components | Example #1 Black | Example #2 White | Example #3 Green | Example #4 Red | Example #5 Yellow | Example #6 |
|---|---|---|---|---|---|---|
| Titanium dioxide rutile |  | 20.0 |  |  | 1.9 | 1.6 |
| Pigment: |  |  |  |  |  |  |
| Lampblack | 3.0 |  | 0.1 |  | 0.1 | 0.1 |
| Phthalocyanine green |  |  | 3.3 |  |  |  |
| Yellow iron oxide |  |  |  |  | 7.0 | 4.7 |
| Cadium red |  |  |  | 15.0 |  |  |
| Lead chromate yellow |  |  |  | 5.6 |  |  |
| Red iron oxide |  |  |  |  |  | 1.2 |
| Acrylonitrile-butadiene copolymer carboxyl modified [1] | 3.0 | 2.0 | 1.5 | 1.0 | 2.0 | 2.0 |
| Vinyl chloride-vinylidene chloride copolymer [2] | 13.0 | 6.7 | 20.0 | 4.0 | 10.0 | 10.0 |
| Methyl methacrylate-ethyl acrylate copolymer [3] | 5.0 | 5.3 | 5.0 | 15.0 | 8.0 | 11.4 |
| Epoxy resin [4] | 3.0 | .8 | 1.0 | 1.5 | 2.0 | 1.1 |
| Phenolic resin [5] | .4 | .2 | .2 | .3 | .5 | 0.2 |
| Methyl ethyl ketone | 22.0 | 20.0 | 19.5 | 19.5 | 21.0 | 18.5 |
| Methyl isobutyl ketone | 33.0 | 30.0 | 29.2 | 29.2 | 31.6 | 20.0 |
| Ethanol | 2.8 | 2.0 | 1.9 | 1.9 | 2.2 | 0.2 |
| Toluol | 11.0 | 10.0 | 9.8 | 9.7 | 10.5 | 28.6 |
| Xylol | 3.8 | 3.0 | 2.9 | 2.9 | 3.2 | 0.4 |
| Total | 100.0 | 100.0 | 100.0 | 100.0 | 100.0 | 100.0 |

[1] Hycar 1472.
[2] Geon 222.
[3] Acryloid B-44.
[4] Araldite 7097.
[5] BKR 2620.

All ingredients were charged into a pebble mill and ground to a Heyman North Standard fineness of 06.0.

To illustrate the manner of use of the novel compositions of this invention and the results obtainable therewith, each of the primer compositions of Examples 1 to 6, inclusive, was sprayed on cold-rolled, degreased, steel panels, to make the aforementioned patterned texture, using the method and conditions aforesaid. Illustrative ink and topcoat compositions, as well as processing combinations which are used with the primers are set forth at this point for convenience.

Pigmented graining ink

The following materials were mixed and roller milled to a 7 plus North Standard Heyman grind gage.

| | Parts by weight |
|---|---|
| Rutile titanium dioxide | 21.15 |
| Molybdate orange | 1.35 |
| Medium lead chromate yellow | 2.0 |
| Lampblack | 1.5 |
| Low molecular weight Bisphenol A-epichlorohydrin type diepoxide 11,000 to 13,000 cps., sp./gr. 1.15, epoxy assay 185–195 (commercial equivalent— Bakelite ERL-2774) | 25.00 |

The following were added to the resulting mixture and the contents mixed until homogeneous:

| | |
|---|---|
| Bakelite epoxy ERL-2774 | 30.40 |
| Magnesium silicate | 12.20 |
| 2-butoxyethanol | 3.70 |
| High boiling aromatic hydrocarbon solvent (commercial equivalent—Esso, Solvesso 1950) | 3.70 |
| | 100.00 |

Clear Vinyl Topcoat

The following ingredients were charged to a pebble mill and ground for 16 hours to obtain a homogeneous dispersion:

| | |
|---|---|
| Polymeric plasticizer, commercial equivalent— Rohm & Haas, Paraplex G-53 | 10.00 |
| Di-octyl phthalate | 10.00 |
| 40% acrylic resin solution in toluol, comm. equiv.—Rohm & Haas, Acryloid B-66 | 12.50 |
| Tin mercaptan stabilizer, comm. equiv.—Advance Chemical, TM-180 | 2.0 |
| High boiling aromatic hydrocarbon solvent, comm. equiv.—Esso, Solvesso 150 | 25.50 |
| High molecular weight polyvinyl chloride homopolymer, comm. equiv.—B. F. Goodrich, Geon 121 | 40.00 |

The processing conditions in using the primers, ink and topcoats are summarized as follows:

Primer Processing

Substrate—Clean, cold-rolled steel.
Application method—Standard commercial spray equipment.
Primer preparation—Thin to 25 seconds, #4 Ford Cup with methyl isobutyl ketone.
Deposit—0.25 to 1.0 mil, dry film thickness.
Dry schedule—Bake 300° F., 5 to 10 minutes.

Ink Processing

Application method—Off-set gravure.
Gravure specification—100 line screen, 80–90 micron depth etch.
Etched pattern design—A pigskin like leather single line design.
Application viscosity—Reduction not necessary, full viscosity 2,000 to 20,000 cps.
Dry schedule—Air dry, application of topcoat may be immediate.

Topcoat Processing

Application method—Standard commercial spray equipment.
Preparation—Thin to 30–35 seconds, #2 Zahn Cup with toluol.
Film deposit—3 to 5 mils, dry film thickness.
Dry schedule—2 min. air dry, 5 minutes at 200° F., 15 min. at 350–365° F.

In all cases, the resulting articles had desirable textured patterns conforming to those of the ink layers, as well as the other characteristics of such articles already mentioned. In addition, all of the textured articles were flexible and exhibited excellent adhesion, impact resistance and color retention. Flexibility was evaluated by use of a 1/8" conical mandrel, in accordance with standard tests. No chipping, cracking or flaking was observed. Adhesion was determined by cutting through the coatings and attempting to peel back the coatings from the substrate and attempting to de-laminate the topcoat from the basecoat or primer. Such attempts failed on the articles of this invention. Impact resistance (direct and reverse) was tested by means of a Gardner variable impact tester. The articles here passed the test at 160 pounds. Color retention was determined by baking for 30 minutes at 350° F. No discoloration was observed here.

The foregoing specific illustrations of the manner of use of the compositions of Examples 1 to 6, inclusive, were repeated, using as substrates tin plate, chrome plate, stainless steel, aluminum, phosphated steel and chemically treated aluminum (Alodine Process). Also, the same illustrations were repeated except for the fact that in place of baking the primer coating on the substrate it was air flash-dried for 5 minutes before the ink and topcoat steps were initiated. The results, in all cases, were substantially the same as before.

It will be understood that the foregoing description and examples illustrate the practice of this invention, which, however, is not to be limited thereby but is to be construed as broadly as permissible in view of the prior art and limited solely by the appended claims.

We claim:
1. A resinous coating composition comprising as essential film-forming components: (a) a carboxyl-modified, butadiene-acrylonitrile copolymer; (b) a vinyl chloride-vinylidene chloride copolymer; (c) a member selected from the group consisting of poly-methyl methacrylate and a copolymer of methyl methacrylate and ethyl acrylate; (d) a polyglycidyl ether of a polyhydric phenol; and (e) a compatible, alkaline-catalyzed, oil insoluble phenol-formaldehyde resin, said coating composition comprising from about 0.5 to 5% weight percent of (a), from about 10 to 30 weight percent of (b), from about 5 to 20 weight percent of (c), from about 0.5 to 5 weight percent of (d), and from about 0.1 to 1 weight percent of (e).

2. A coating composition as set forth in claim 1, wherein a copolymer of methyl methacrylate and ethyl acrylate is said member.

3. A coating composition as set forth in claim 2, which comprises 3 percent of (a), 13 percent of (b), 5 percent of (c), 3 percent of (d), and 0.4 percent of (e) said percentages being percentages by weight.

4. A coating composition as set forth in claim 2, which comprises 2 percent of (a), 6.7 percent of (b), 5.3 percent of (c), 0.8 percent of (d), and 0.2 percent of (e) said percentages being percentages by weight.

5. A coating composition as set forth in claim 2, which comprises 1.5 percent of (a), 20 percent of (b), 15 percent of (c), 1 percent of (d), and 0.2 percent of (e) said percentages being percentages by weight.

6. A coating composition as set forth in claim 2, which cent of (c), 1.5 percent of (d), and 0.3 percent of (e) comprises 1 percent of (a), 4 percent of (b), 15 percent of said percentages being percentages by weight.

7. A coating composition as set forth in claim 2, which comprises 2 percent of (a), 10 percent of (b), 8 percent of (c), 2 percent of (d), and 0.5 percent of (e) said percentages being percentages by weight.

8. A coating composition as set forth in claim 2, which comprises 2 percent of (a), 10 percent of (b), 11.4 percent of (c), 1.1 percent of (d), and 0.2 percent of (e) said percentages being percentages by weight.

References Cited

UNITED STATES PATENTS

| | | | |
|---|---|---|---|
| RE 25,625 | 7/1964 | Been | 260—831 |
| 3,011,909 | 12/1961 | Hart | 260—831 |
| 3,245,925 | 4/1966 | Watson | 260—831 |
| 3,280,217 | 10/1966 | Lader | 260—831 |
| 3,324,197 | 6/1967 | Schwarzer | 260—831 |

MURRAY TILLMAN, Primary Examiner

P. LIEBERMAN, Assistant Examiner

U.S. Cl. X.R.

117—132, 138.8, 148, 155; 260—32.8, 33.4, 33.6, 37 38, 41, 45.75, 47, 57, 82.3, 87.7, 837